United States Patent [19]

Kumar et al.

[11] Patent Number: 5,395,427
[45] Date of Patent: Mar. 7, 1995

[54] TWO STAGE PRESSURE SWING ADSORPTION PROCESS WHICH UTILIZES AN OXYGEN SELECTIVE ADSORBENT TO PRODUCE HIGH PURITY OXYGEN FROM A FEED AIR STREAM

[75] Inventors: Ravi Kumar, Allentown; Kevin F. Mansfield, Harleysville; Robert F. Weimer, Allentown, all of Pa.

[73] Assignee: Air Products and Chemicals, Inc., Allentown, Pa.

[21] Appl. No.: 180,739

[22] Filed: Jan. 12, 1994

[51] Int. Cl.⁶ .............................................. B01D 53/04
[52] U.S. Cl. .......................................... 95/101; 95/117; 95/122; 95/130; 95/138; 95/139
[58] Field of Search ............................ 95/96–98, 95/100–105, 117–119, 122, 130, 138, 139, 148

[56] References Cited

U.S. PATENT DOCUMENTS

| | | | |
|---|---|---|---|
| 3,149,934 | 9/1964 | Martin | 95/98 |
| 3,636,679 | 1/1972 | Batta . | |
| 3,923,477 | 12/1975 | Armond et al. | 95/130 X |
| 4,070,164 | 1/1978 | Miwa et al. | 95/101 |
| 4,129,424 | 12/1978 | Armond | 95/98 |
| 4,566,881 | 1/1986 | Richter et al. | 95/138 X |
| 4,685,939 | 8/1987 | Kratz et al. | 95/100 |
| 4,775,394 | 10/1988 | Yamano et al. | 95/101 |
| 4,810,265 | 3/1989 | Lagree et al. | 95/101 |
| 4,892,565 | 1/1990 | Schmidt et al. | 95/101 |
| 4,985,052 | 1/1991 | Haruna et al. | 95/138 X |
| 5,126,466 | 6/1992 | Ramprasad et al. | 556/138 |
| 5,137,549 | 8/1992 | Stanford et al. | 55/26 |
| 5,141,725 | 8/1992 | Ramprasad et al. | 423/219 |
| 5,154,737 | 10/1992 | Jenkins et al. | 95/98 X |
| 5,208,335 | 5/1993 | Ramprasad et al. | 544/225 |
| 5,239,098 | 8/1993 | Ramprasad | 556/140 |

FOREIGN PATENT DOCUMENTS 1559325 1/1980 United Kingdom .

*Primary Examiner*—Robert Spitzer
*Attorney, Agent, or Firm*—Robert J. Wolff

[57] ABSTRACT

A two stage pressure swing adsorption process is set forth for producing high purity oxygen from a feed air stream wherein carbon dioxide, water and preferably nitrogen are removed in the first stage and wherein an oxygen selective adsorbent is used to adsorb oxygen in the second stage. The oxygen product is recovered upon depressurization of the second stage. The high purity of the oxygen product is achieved by rinsing the oxygen selective adsorbent with oxygen prior to the depressurization step. A key to the present invention is that the effluent streams from the second stage feed and rinse steps are used to regenerate the first stage adsorbent(s) in a specific regeneration scheme.

7 Claims, 1 Drawing Sheet

TWO STAGE PRESSURE SWING ADSORPTION PROCESS WHICH UTILIZES AN OXYGEN SELECTIVE ADSORBENT TO PRODUCE HIGH PURITY OXYGEN FROM A FEED AIR STREAM

TECHNICAL FIELD

The present invention relates to a two stage pressure swing adsorption process to produce high purity (99+%) oxygen from a feed air stream comprising (1) passing the feed air stream through a first stage adsorption zone containing one or more adsorbents selective for the retention of impurities comprising carbon dioxide and water; (2) passing the impurity-depleted effluent stream from step (1) through a second stage adsorption zone containing an adsorbent selective for the retention of oxygen; (3) rinsing the second stage adsorption zone with oxygen in order to purge from the stage adsorption zone any co-adsorbed or void space impurities comprising argon; and (4) depressurizing the second stage adsorption zone to produce an effluent stream containing said high purity oxygen.

BACKGROUND OF THE INVENTION

A two stage pressure swing adsorption process to produce high purity oxygen from a feed air stream comprising steps (1) through (4) as described above is taught in the art. For example, U.S. Pat. No. 5,137,549 by Stanford et al. teaches such a process. The present invention is an improvement to Stanford whereby the effluent streams from steps (2) and (3) are used to regenerate the first stage adsorbent(s) in a specific regeneration scheme.

SUMMARY OF THE INVENTION

The present invention is a two stage pressure swing adsorption process for producing high purity oxygen from a feed air stream wherein carbon dioxide, water and preferably nitrogen are removed in the first stage and wherein an oxygen selective adsorbent is used to adsorb oxygen in the second stage. The oxygen product is recovered upon depressurization of the second stage. The high purity of the oxygen product is achieved by rinsing the oxygen selective adsorbent with oxygen prior to the depressurization step. A key to the present invention is that the effluent streams from the second stage feed and rinse steps are used to regenerate the first stage adsorbent(s) in a specific regeneration scheme.

The specific steps of the present invention comprise:
(a) passing the feed air stream through a first stage adsorption zone containing one or more adsorbents selective for the retention of impurities comprising carbon dioxide and water to produce an impurity saturated adsorption zone and an impurity-depleted effluent stream;
(b) regenerating the first stage adsorption zone via:
  (i) depressurizing the first stage adsorption zone to produce an impurity-containing effluent stream which is discarded as waste;
  (ii) purging the first stage adsorption zone with a first purge gas in order to purge the adsorption zone of any impurities comprising carbon dioxide and water still remaining in the adsorption zone at the end of step (b) (i) wherein the effluent stream from this step is discarded as waste;
  (iii) further purging the first stage adsorption zone with a second purge gas in order to purge the adsorption zone of any impurities comprising carbon dioxide and water still remaining in the adsorption zone at the end of step (b) (ii) wherein the effluent stream from this step is discarded as waste; and
  (iv) repressurizing the first stage adsorption zone with a repressurization gas;
(c) passing the impurity-depleted effluent stream from step (a) through a second stage adsorption zone containing an adsorbent selective for the retention of oxygen to produce an oxygen saturated adsorption zone and an oxygen-depleted effluent stream wherein at least a portion of said oxygen-depleted effluent stream is used as the second purge gas in step (b)(iii); and
(d) regenerating the second stage adsorption zone via:
  (i) rinsing the second stage adsorption zone with a first rinse gas consisting of essentially pure oxygen in order to purge from the adsorption zone any co-adsorbed or void space impurities comprising argon wherein at least a portion of the effluent from this step (d)(i) is used as the repressurization gas in step (b)(iv);
  (ii) further rinsing the second stage adsorption zone with a second rinse gas consisting of essentially pure oxygen in order to further purge from the adsorption zone any co-adsorbed or void space impurities comprising argon still remaining in the adsorption zone at the end of step (d)(i) wherein at least a portion of the effluent from this step (d)(ii) is used as the first purge gas in step (b)(ii); and
  (iii) depressurizing the second stage adsorption zone to produce an effluent stream containing said high purity oxygen wherein a portion of said effluent stream is used as the first and second rinse gases in steps (d)(i) and (d)(ii).

In one embodiment of the present invention, steps (a) through (b) are performed on the first stage adsorption zone as a continually repeating cycle of steps; steps (c) through (d) are performed on the second stage adsorption zone as a continually repeating cycle of steps; and the process is effected in a system comprising a plurality of first stage adsorption zones and a plurality of second stage adsorption zones which each undergo their respective cycle of steps while collectively operated sequentially in parallel with one another.

DETAILED DESCRIPTION OF THE INVENTION

Figure 1:
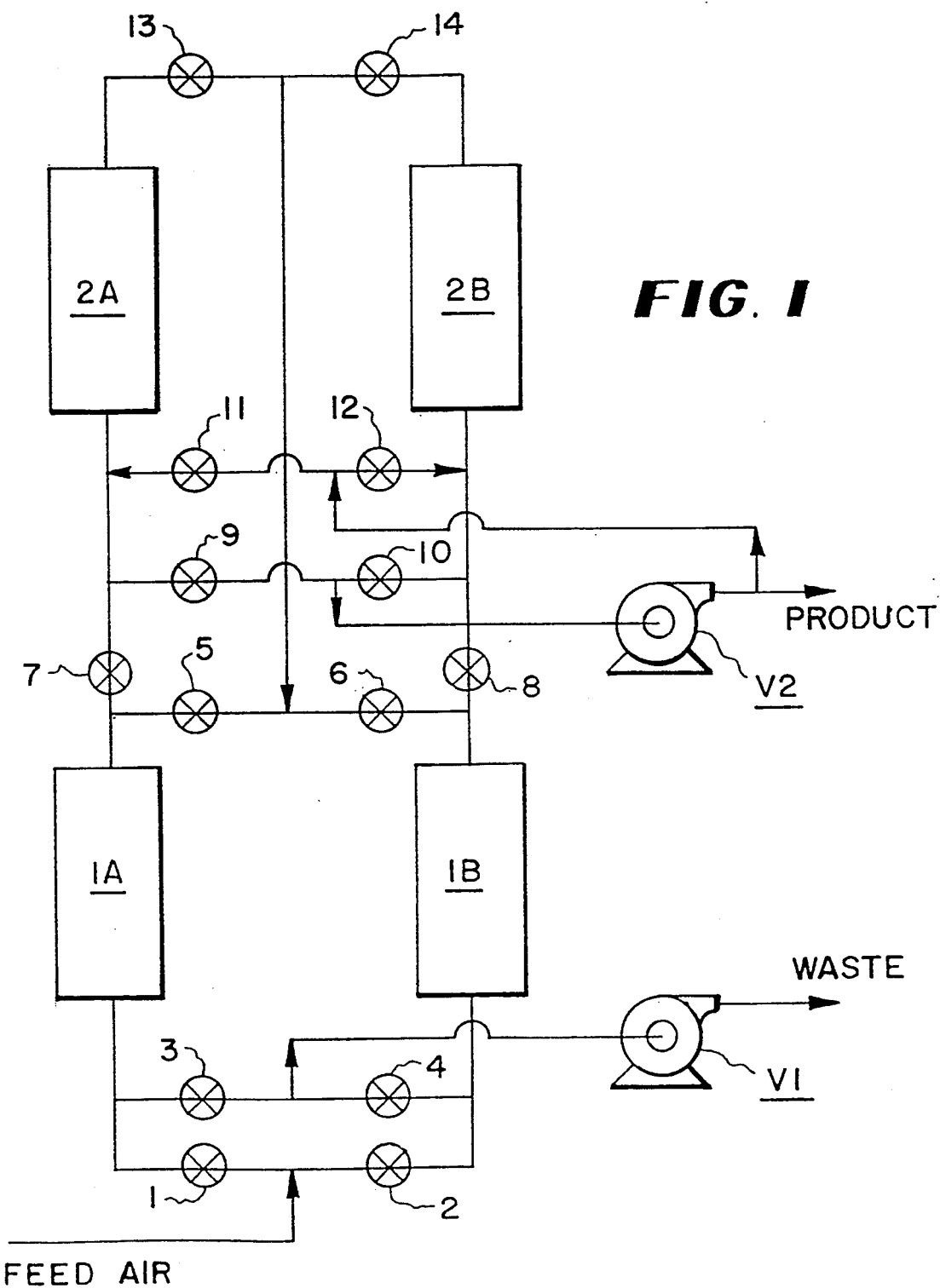
FIG. 1 is drawing illustrating one embodiment of the process of the present invention.

The present invention will now be described in detail with reference to the drawing of FIG. 1. FIG. 1 is a schematic diagram illustrating one embodiment of the present invention wherein the process is effected in a system comprising two first stage adsorption zones and two second stage adsorption zones which each undergo their respective cycle of steps while collectively operated sequentially in parallel with one another. Table 1 summarizes FIG. 1's adsorption zone step sequence and valve sequence for one complete cycle. Table 1 utilizes 6 time intervals and a total elapsed time of 16 time units to cover the steps of the cycle so that the relative times for each step can be clearly indicated. It should be recognized that FIG. 1's embodiment and Table 1's operation sequence is only an example. Other embodiments, such as embodiments which use more or less adsorption zones per stage than does FIG. 1, can be easily designed by one skilled in the art.

TABLE 1

|  | Time Interval | | | | | |
|---|---|---|---|---|---|---|
|  | 0–4 | 4–7 | 7–8 | 8–12 | 12–15 | 15–16 |
| Adsorption Zone Operation* | | | | | | |
| First Stage Zone 1A | (a) | (b)(i) | (b)(ii) | (b)(iii) | (b)(iv) | idle |
| First Stage Zone 1B | (b)(iii) | (b)(iv) | idle | (a) | (b)(i) | (b)(ii) |
| Second Stage Zone 2A | (c) | (d)(i) | (d)(ii) | (d)(iii) | (d)(iii) | (d)(iii) |
| Second Stage Zone 2B | (d)(iii) | (d)(iii) | (d)(iii) | (c) | (d)(i) | (d)(ii) |
| Valve Position** | | | | | | |
| Valve 1 | 0 | | | | | |
| Valve 2 | | | | 0 | | |
| Valve 3 | | 0 | 0 | 0 | | |
| Valve 4 | 0 | | | | 0 | 0 |
| Valve 5 | | | 0 | 0 | 0 | |
| Valve 6 | 0 | 0 | | | | 0 |
| Valve 7 | 0 | | | | | |
| Valve 8 | | | | 0 | | |
| Valve 9 | | | | 0 | 0 | 0 |
| Valve 10 | 0 | 0 | 0 | | | |
| Valve 11 | | 0 | 0 | | | |
| Valve 12 | | | | | 0 | 0 |
| Valve 13 | 0 | 0 | 0 | | | |
| Valve 14 | | | | 0 | 0 | 0 |

*(a), (b)(i), (b)(ii), (b)(iii), (b)(iv), (c), (d)(i), (d)(ii) and (d)(iii) correspond to steps (a), (b)(i), (b)(ii), (b)(iii), (b)(iv), (c), (d)(i), (d)(ii) and (d)(iii) of the present invention as defined in Claim 1.
**0 = open; otherwise closed.

By way of example, Table 1's step sequence and valve sequence will be described as it relates to the operation of FIG. 1's "A" train of adsorption zones comprising first stage adsorption zone 1A and second stage adsorption zone 2A. FIG. 1's "B" train of adsorption zones comprising first stage adsorption zone 1B and second stage adsorption zone 2B undergoes a similar sequence of operation as can be further detailed from Table 1.

During the first time interval (time units 0–4), first stage adsorption zone 1A undergoes its adsorption step or step (a) of the present invention. The feed air stream is passed through 1A (via open valves 1 and 7) containing one or more adsorbents selective for the retention of impurities comprising carbon dioxide and water to produce an impurity saturated adsorption zone and an impurity-depleted effluent stream which is withdrawn through open valve 7. Also during the first time interval, second stage adsorption zone 2A undergoes its adsorption step or step (c) of the present invention. The impurity-depleted effluent stream from 1A is passed through 2A (via open valves 7 and 13) containing an adsorbent selective for the retention of oxygen to produce an oxygen saturated adsorption zone and an oxygen-depleted effluent stream which is withdrawn through open valve 13. The oxygen-depleted effluent stream is used as the second purge gas for 1B which is currently undergoing its further purge step or step (b)(iii) of the present invention.

During the second time interval (time units 4–7), first stage adsorption zone 1A begins its regeneration sequence starting with its depressurization step or step (b) (i) of the present invention. 1A is depressurized to produce an impurity-containing effluent stream which is discarded as a waste stream through open valve 3 and vacuum compressor V1. Also during the second time interval, second stage adsorption zone 2A begins its regeneration sequence starting with its initial rinse step or step (d) (i) of the present invention. 2A is rinsed through open valve 11 with a first rinse gas consisting of essentially pure oxygen (and more specifically consisting of the effluent from 2B which is currently in the middle of its depressurization step or step (d)(iii) of the present invention) in order to purge from the adsorption zone any co-adsorbed or void space impurities comprising argon. The effluent from this step is withdrawn through open valve 13 and is used as the repressurization gas for 1B which is currently undergoing its repressurization step or step (b)(iv) of the present invention.

During the third time interval (time units 7–8), first stage adsorption zone 1A undergoes its initial purge step or step (b)(ii) of the present invention. 1A is purged through open valve 5 with a first purge gas (consisting of the effluent from 2A which is currently undergoing its further rinse step or step (d)(ii) of the present invention) in order to purge 1A of any impurities comprising carbon dioxide and water still remaining in 1A at the end of its depressurization step. The effluent stream from this step is discarded as a waste stream through open valve 3 and vacuum compressor V1. Also during the third time interval, second stage adsorption zone 2A undergoes its further rinse step or step (d)(ii) of the present invention. 2A is further rinsed through open valve 11 with a rinse gas consisting of essentially pure oxygen (and more specifically consisting of the effluent from 2B which is currently finishing its depressurization step or step (d)(iii) of the present invention) in order to purge from the adsorption zone any co-adsorbed or void space impurities comprising argon still remaining in 2A at the end of step (d)(i). The effluent from this step is used as the first purge gas for 1A which is currently undergoing its initial purge step or step (b)(ii) of the present invention.

During the fourth time interval (time units 8–12), first stage adsorption zone 1A undergoes its further purge step or step (b)(iii) of the present invention. 1A is further purged through open valve 5 with a second purge gas (consisting of the effluent from 2B which is currently undergoing its adsorption step or step (c) of the present invention) in order to purge 1A of any impurities comprising carbon dioxide and water still remaining in the 1A at the end of its initial purge step. The effluent stream from this step is discarded as a waste stream through open valve 3 and vacuum compressor V1. Also during the fourth time interval, second stage adsorption zone 2A begins its depressurization step or step (d)(iii) of the present invention. 2A is depressurized to produce an effluent stream containing high purity oxygen which is withdrawn through open valve 9 and vacuum compressor V2 and which is recovered as a product stream.

During the fifth time interval (time units 12–15), first stage adsorption zone 1A undergoes its repressurization step or step (b)(iv) of the present invention. 1A is repressurized through open valve 5 with a repressurization gas consisting of the effluent from 2B which is currently undergoing its initial rinse step or step (d)(i) of the present invention. Also during the fifth time interval, second stage adsorption zone 2A continues its depressurization step or step (d)(iii) of the present invention. 2A is further depressurized to produce an effluent stream containing high purity oxygen which is withdrawn through open valve 9 and vacuum compressor V2 and which is used as the first rinse gas for 2B which is currently undergoing its initial rinse step or step (d)(i) of the present invention.

Finally, during the sixth time interval (time units 15–16), first stage adsorption zone 1A is idle. After the sixth time interval, 1A's cycle is complete and a new cycle can commence. Steps (a) through (b) are performed on 1A as a continually repeating cycle of steps. Also during the sixth time interval, second stage adsorption zone 2A completes its depressurization step or step (d)(iii) of the present invention. 2A is further depressurized to produce an effluent stream containing high purity oxygen which is withdrawn through open valve 9 and vacuum compressor V2 and which is used as the second rinse gas for 2B which is currently undergoing its further rinse step or step (d) (ii) of the present invention. After the sixth time interval, 2A's cycle is complete and a new cycle can commence. Steps (c) through (d) are performed on 2A as a continually repeating cycle of steps.

It should be noted that the steps of the present invention as depicted in FIG. 1 are carried out by the action of a sub-ambient pressure applied to the outlet of the adsorption zones via vacuum compressors V1 and V2. This mode of carrying out the steps saves power because the quantity of gas exiting the each adsorption zone is lower than the quantity of gas feeding it. The concept of drawing a feed gas mixture through an adsorption zone by the action of a sub-ambient pressure applied to the outlet of the adsorption zone in order to save power is taught in British Patent 1,559,325.

It should further be noted in FIG. 1 that, with respect to the second stage adsorption zone's cycle of steps, the adsorption step or step (c) of the present invention immediately follows the depressurization step or step (d)(ii) of the present invention such that repressurization of the second stage adsorption zone occurs during step (c). This enables one to operate the process continuously with only two vacuum compressors and four adsorption zones, two in each stage. The concept of merging adsorption and repressurization into one step is taught in U.S. Pat. No. 3,636,679.

It should still further be noted that a preferred oxygen selective adsorbent to be used in the second stage comprises an equilibrium controlled cobalt-based adsorbent as taught in U.S. Pat. Nos. 5,126,466; 5,141,725; 5,208,335 and 5,239,098 all by Ramprasad et al. As discussed in these patents, the Ramprasad adsorbents are preferred in that they have the following properties:

(a) a reversible isotherm having a Langmuir Type I shape;
(b) fast adsorption and desorption kinetics;
(c) infinite selectivity for oxygen; and
(d) no phase change in oxygenation/deoxygenation cycle.

It should still further be noted that, in addition to carbon dioxide and water, nitrogen can be one of the impurities that the adsorbent(s) contained in the first stage adsorption zone is selective toward. This feature allows for a reduction in the amount of the relatively expensive cobalt-based adsorbent needed in the second stage. This feature also allows for a higher final depressurization pressure when depressurizing the second stage adsorption zone. Finally, this feature produces a relatively concentrated argon stream as the effluent from the second stage adsorption zone, at least a portion of which could be subject to further treatment for argon purification and production. It should be noted, however, that allowing all or a portion of the nitrogen to pass through the first stage unadsorbed is within the scope of the present invention. In this scenario, the effluent stream from the second stage adsorption zone will consist primarily of an argon, nitrogen and any oxygen which remains unadsorbed by the oxygen selective adsorbent contained in the second stage adsorption zone.

Finally it should be noted that the pressure swing between the adsorption pressure and the final depressurization pressure for each of the adsorption zones in FIG. 1 is not limited to a pressure swings from near ambient to sub-ambient pressures (ie vacuum swing adsorption or VSA). The scope of the present invention also encompasses pressure swings from above ambient to near ambient pressures.

The present invention has been described with reference to a specific embodiment thereof. This embodiment should not be seen as a limitation of the scope of the present invention; the scope of such being ascertained by the following claims.

We claim:

1. A two stage pressure swing adsorption process to produce high purity oxygen from a feed air stream comprising the steps of:
    (a) passing the feed air stream through a first stage adsorption zone containing one or more adsorbents selective for the retention of impurities comprising carbon dioxide and water to produce an impurity saturated adsorption zone and an impurity-depleted effluent stream;
    (b) regenerating the first stage adsorption zone via:
        (i) depressurizing the first stage adsorption zone to produce an impurity-containing effluent stream which is discarded as waste;
        (ii) purging the first stage adsorption zone with a first purge gas in order to purge the adsorption zone of any impurities comprising carbon dioxide and water still remaining in the adsorption zone at the end of step (b)(i) wherein the effluent stream from this step is discarded as waste;
        (iii) further purging the first stage adsorption zone with a second purge gas in order to purge the adsorption zone of any impurities comprising carbon dioxide and water still remaining in the adsorption zone at the end of step (b) (ii) wherein the effluent stream from this step is discarded as waste; and
        (iv) repressurizing the first stage adsorption zone with a repressurization gas;
    (c) passing the impurity-depleted effluent stream from step (a) through a second stage adsorption zone containing an adsorbent selective for the retention of oxygen to produce an oxygen saturated adsorption zone and an oxygen-depleted effluent stream wherein at least a portion of said oxygen-depleted effluent stream is used as the second purge gas in step (b)(iii); and
    (d) regenerating the second stage adsorption zone via:
        (i) rinsing the second stage adsorption zone with a first rinse gas consisting of essentially pure oxygen in order to purge from the adsorption zone any co-adsorbed or void space impurities comprising argon wherein at least a portion of the effluent from this step (d)(i) is used as the repressurization gas in step (b)(iv);
        (ii) further rinsing the second stage adsorption zone with a second rinse gas consisting of essentially pure oxygen in order to further purge from the adsorption zone any co-adsorbed or void space impurities comprising argon still remaining in the adsorption zone at the end of step (d)(i) wherein at least a portion of the effluent from this step (d)(ii) is used as the first purge gas in step (b)(ii); and (iii) depressurizing the second stage adsorption zone to produce an effluent stream containing said high purity oxygen wherein a portion of said effluent stream is used as the first and second rinse gases in steps (d)(i) and (d)(ii).

2. The process of claim 1 wherein:
(a) steps (a) through (b) are performed on the first stage adsorption zone as a continually repeating cycle of steps;
(b) steps (c) through (d) are performed on the second stage adsorption zone as a continually repeating cycle of steps; and
(c) the process is effected in a system comprising a plurality of first stage adsorption zones and a plurality of second stage adsorption zones which each undergo their respective cycle of steps while collectively operated sequentially in parallel with one another.

3. The process of claim 2 wherein the steps are carried out by the action of a sub-ambient pressure applied to the outlet of the adsorption zones.

4. The process of claim 3 wherein step (c)'s feed step immediately follows step (d)(ii)'s depressurization step in the second stage adsorption zone's cycle of steps such that repressurization of the second stage adsorption zone occurs during step (c).

5. The method of claim 4 wherein the adsorbent in the second stage adsorption zone selective for the retention of oxygen comprises an equilibrium controlled cobalt-based adsorbent.

6. The process of claim 5 wherein, in addition to carbon dioxide and water, nitrogen is one of the impurities that the adsorbent(s) contained in the first stage adsorption zone are selective toward.

7. The process of claim 6 wherein a portion of the oxygen-depleted effluent stream from step (c) is subject to further treatment for argon purification and production.

* * * * *